(12) United States Patent
Ogawa et al.

(10) Patent No.: US 6,330,242 B1
(45) Date of Patent: Dec. 11, 2001

(54) LOOSE SOURCE ROUTING METHOD OF IP PACKET ON ATM NETWORK

(75) Inventors: Makoto Ogawa; Motoo Nishihara; Michio Masuda; Kurenai Murakami, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/114,135

(22) Filed: Jul. 13, 1998

(30) Foreign Application Priority Data

Jul. 14, 1997 (JP) .................................................. 9-202591

(51) Int. Cl.[7] .................................................. H04L 12/28
(52) U.S. Cl. ................ 370/395.52; 370/474; 370/395.62
(58) Field of Search .................................. 370/395, 351.3, 370/389, 464.9, 473.4, 395.52, 395.62; 709/238, 242

(56) References Cited

U.S. PATENT DOCUMENTS

| | | | |
|---|---|---|---|
| 5,701,300 | * 12/1997 | Jeon et al. | 370/392 |
| 5,917,828 | * 6/1999 | Thompson | 370/474 |
| 6,137,798 | * 10/2000 | Nishihara et al. | 370/392 |

FOREIGN PATENT DOCUMENTS 512 495   11/1992  (EP) .
8223217    8/1996  (JP) .

OTHER PUBLICATIONS

Jean–Yves Le Boudec et al., "Connectionless data service in an ATM–based customer premises network", Computer Networks and ISDN Systems, vol. 26:11, 1994, pp. 1409–1424.
Ogawa et al., "A New Scheme of Connectionless Transmission over ATM," *Technical Report of IBICE*, SSE97–36, RCS97–31 (Jun. 1997).

* cited by examiner

Primary Examiner—David R. Vincent
(74) Attorney, Agent, or Firm—Foley & Lardner (57) ABSTRACT

A loose source routing method is provided to transfer an IP packet from a transmission source gateway to a transfer destination gateway by way of ATM nodes, which are freely designated. At the transmission source gateway, the IP packet given from a user LAN is dissolved into ATM cells containing a BOM cell whose destination address designates the transfer destination gateway. In addition, at least one pseudo BOM cell whose destination address designates an ATM node in the ATM network is added and is located at a top place of a cell stream constructed by the dissolved ATM cells. Thus, the cell stream is transferred from the transmission source gateway to the designated ATM node in accordance with the destination address of the pseudo BOM cell. The designated ATM node discards the pseudo BOM cell so that the original BOM cell is now located at the top place of the cell stream. Then, the cell stream is transferred from the ATM node to the transfer destination gateway in accordance with the destination address of the BOM cell. The transfer destination gateway assembles the ATM cells into the IP packet, which is then sent to a user LAN.

7 Claims, 11 Drawing Sheets

LOOSE SOURCE ROUTING METHOD OF IP PACKET ON ATM NETWORK

BACKGROUND OF THE INVENTION

1. Field of the Invention

This invention relates to loose source routing methods that perform routing of IP packets (where "IP" is an abbreviation for "Internet Protocol"), which are transferred through ATM networks (where "ATM" is an abbreviation for "Asynchronous Transfer Mode"). Particularly, this invention relates to the loose source routing method in which a transmission source gateway basically designates a passing node of the ATM network through which ATM cells corresponding to the IP packet pass. This application is based on patent application No. Hei 9-202591 filed in Japan, the content of which is incorporated herein by reference.

2. Description of the Related Art

Recent tendency of telecommunications increase demands to provide application of local connectionless characteristics of user LANs (an abbreviation for "Local Area Network") to the global ATM networks with high speed and low cost.

For instance, the paper of Japanese Patent Application, Publication No. 4-138739 discloses an example of the routing method of ATM cells, which is achieved as follows:

At the routing of connectionless packets such as IP packets over the ATM networks, ATM cells are placed on virtual connections (abbreviated by "VC") corresponding to a direction of a destination user interface at the passing node of the ATM network. Herein, the destination user interface is written on a top cell of the packet, which is called a BOM cell (where "BOM" is an abbreviation for "Beginning Of Message").

Figure 9:
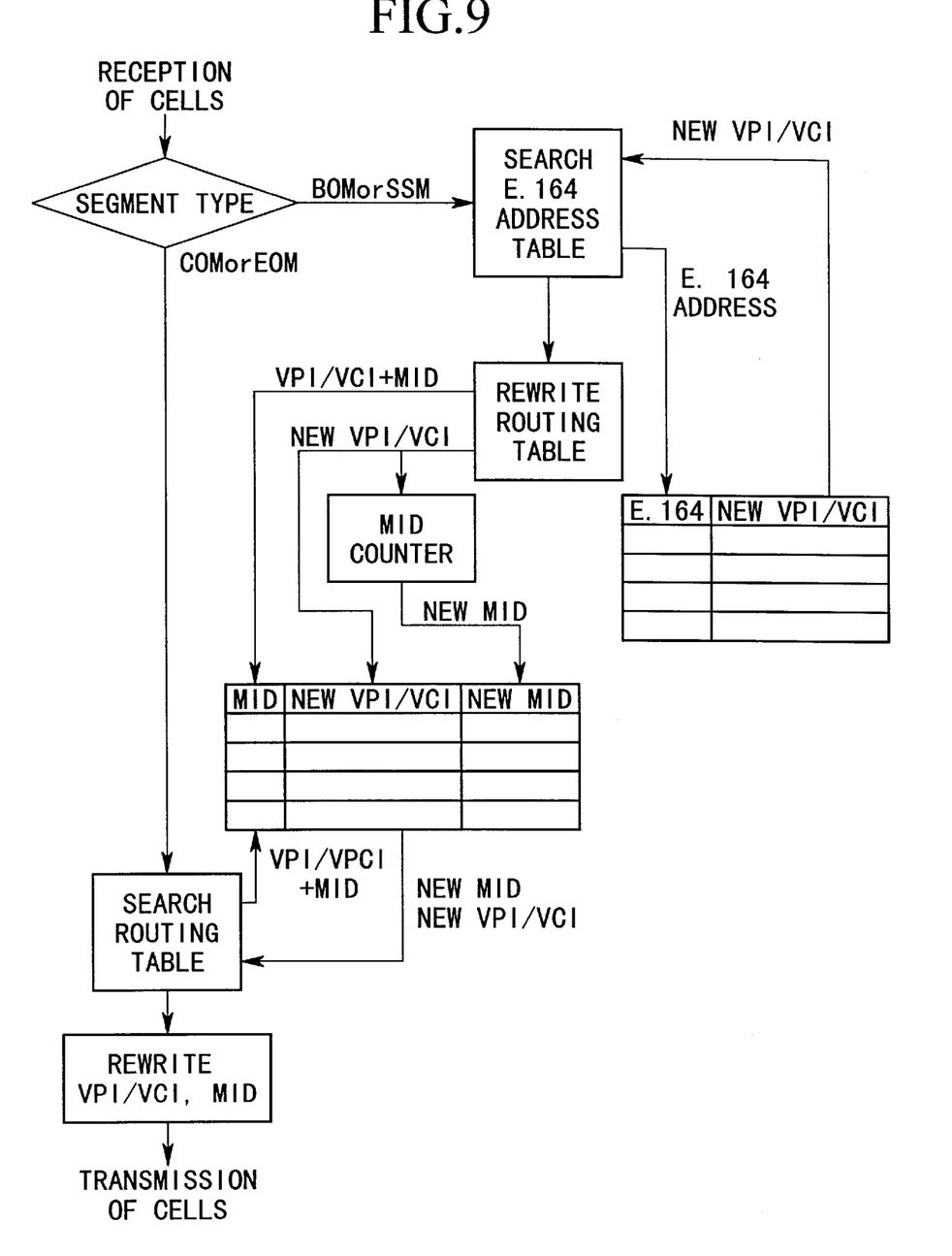
FIG. 9 is an algorithm diagram showing a conventional example of the routing method of connectionless packets in the ATM network.

FIG. 9 is an algorithm diagram showing a conventional example of the routing method of connectionless packets in the ATM network. Herein, a series of received ATM cells pass through an ATM node. In the case of the BOM cell within the series of ATM cells, the routing of the BOM cell is performed with reference to destination address E.164 stored in the BOM cell. As for the cells other than the BOM cell within the series of ATM cells, the routing is performed with reference to the content of the aforementioned routing of the BOM cell.

Conventionally, the source routing method, which is designed such that a transfer path is designated by a transmission source for transfer of an IP packet, is used to designate the transfer path in response to the policy of the transmission source and is used to configure a specific service network on the existing network.

Figure 10:
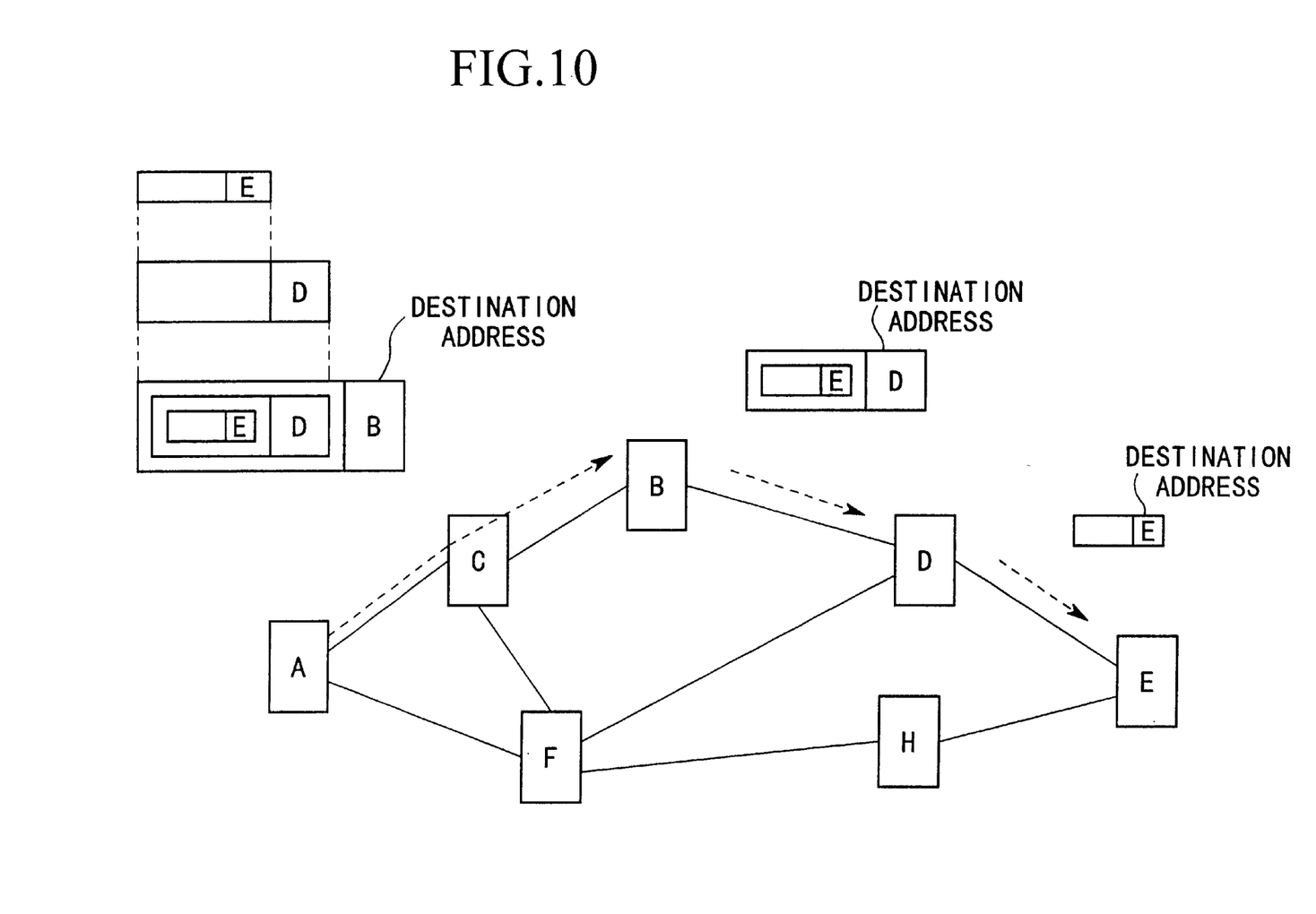
FIG. 10 is a conceptual diagram showing a conventional example of the source routing method of the IP packet.

The IP packet communication, which is represented by "Ipv4" (i.e., IP Version 4), for example, defines a technique called "tunneling" as the source routing method for designation of the transfer path. FIG. 10 is a conceptual diagram showing the source routing method employing the "tunneling" of the IP packets.

According to this method, an IP packet to be transmitted through a designated path is capsulated by an IP header whose destination address corresponds to an address of a passing node at first. Then, the capsulated IP packet is transmitted toward the passing node. Within a transmission path terminated by the passing node, transmission of the packet is performed using the destination address of the IP packet used for capsulation of the packet. At the passing node which receives the packet addressed thereto, the passing node dissolves the capsulation of the packet. So, the IP packet is transferred to a real address which corresponds to the original destination address of the IP packet.

In addition, the conventional technology provides combinations of the aforementioned techniques for the source routing of the IP packets on the ATM network. That is, the conventional technology provides a method that at a passing node, cells are assembled into an IP packet, which is relayed to another node. For example, the paper of Japanese Patent Application, Publication No. 8-56227 discloses the technology that an ATM communication node is equipped with a packet relay unit, which has a frame assembling section for assembling ATM cells into a packet and a packet routing section having a routing function.

Figure 11:
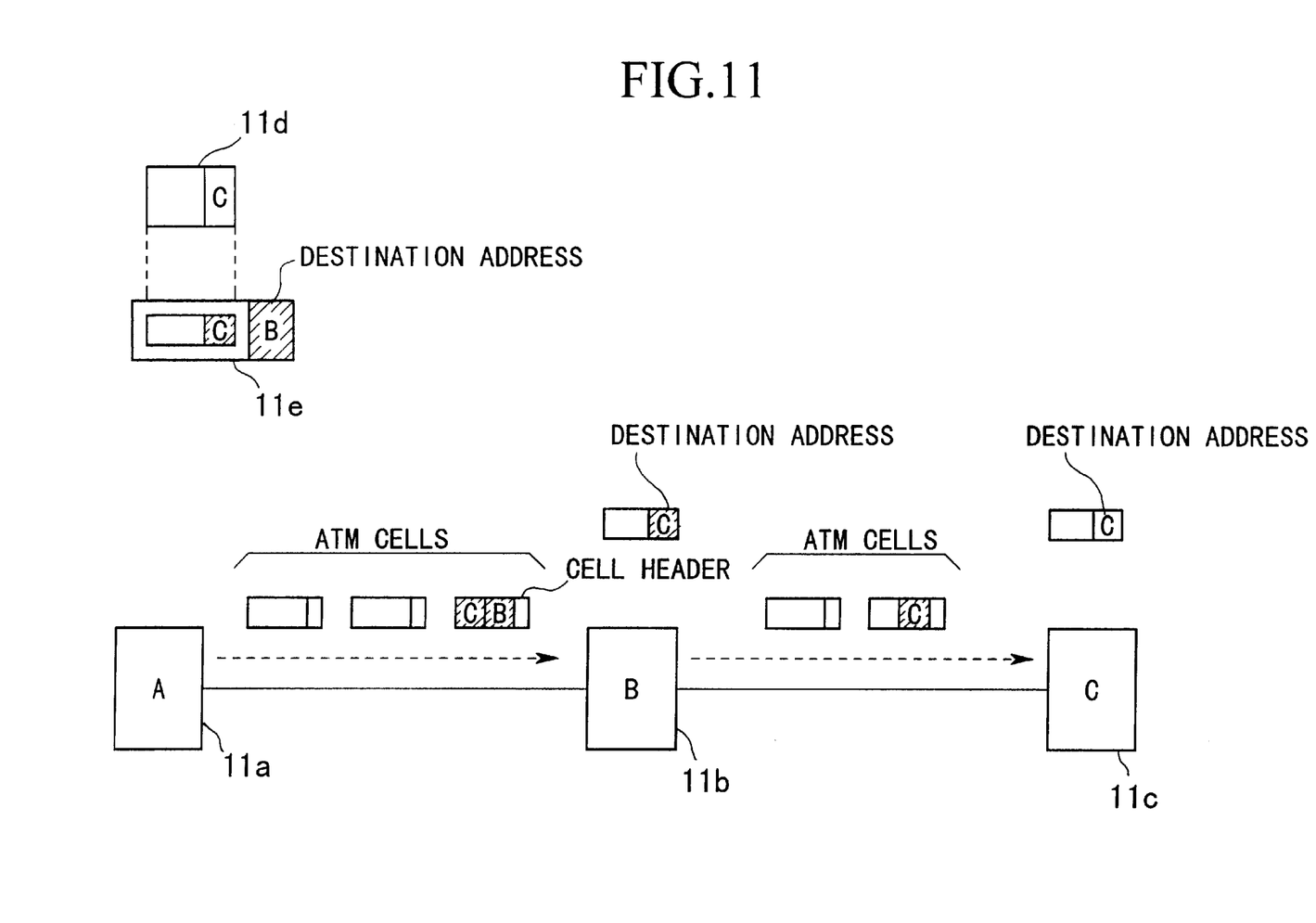
FIG. 11 is a conceptual diagram showing a conventional example of the source routing method employed for the ATM network.

FIG. 11 is a conceptual diagram showing an example of the above source routing method, wherein there are provided a transmission source node 11a, an ATM router 11b and a transfer destination node 11c. Herein, the transmission source node 11a transmits packets while designating a node that the packets pass through, so that the ATM router (or ATM node) 11b is designated by the transmission source node 11a in such a way that the transmitted packets pass through the ATM router 11b. Thus, the packets are finally transferred to the transfer destination node 11c. In addition, reference symbol "11d" designates an IP packet that is transmitted from the transmission source node 11a, while "11e" designates a capsulated IP packet, which is capsulated at the transmission source node 11a using an IP header whose destination address corresponds to the ATM node 11b.

The system of FIG. 11 is configured in such a way that the transmission source node 11a transfers the IP packet to the transfer destination node 11c by way of the ATM router 11b. Herein, the IP packet 11d to be transferred is capsulated in accordance with the IP header whose destination address corresponds to address B of the ATM router 11b that the packet should pass through. Then, the IP packet is subjected to ATM cell formation, so that a stream of ATM cells are transmitted to the ATM router 11b. Such an ATM cell stream corresponding to the capsulated IP packet is transmitted to the ATM router 11b by using the destination address of the IP header, which is capsulated. When receiving the ATM cell stream, the ATM router 11b temporarily assembles the ATM cells into the packet and dissolves capsulation of the packet. In accordance with destination address C which corresponds to an original destination address of the IP packet, the IP packet is transferred to the transfer destination node 11c.

As described above, the conventional source routing method is designed as follows:

The passing node dissolves capsulation of the packet, wherein the IP header designating the passing node is eliminated so that only the packet is transferred to the transfer destination node.

For this reason, the conventional method should reassemble the cells into the packet. In other words, at all of the passing nodes that dissolve capsulation of the packets, the cells corresponding to transfer data should be reassembled into the packets. With respect to the cell stream to be transferred, transfer delay should be increased as a number of the passing nodes is increased. So, there is a problem that the conventional method cannot perform routing process at high speed. In addition, the conventional method requires provision of cell assembling mechanism at each passing node. Thus, the conventional method requires a large scale of hardware configuration.

Meanwhile, the loose source routing of IP packets is designed such that due to capsulation, the passing node is provided as a part of the IP packet. Thus, a packet length should be elongated as a number of passing nodes which are designated is increased. For this reason, if the transmission source designates an extremely large number of passing nodes, the packet length of the IP packet exceeds a maximum length, so there occurs a possibility that the transmission source cannot designate the passing nodes.

SUMMARY OF THE INVENTION

It is an object of the invention to provide a loose source routing method that is capable of performing transfer of IP packets on an ATM network while freely designating transfer paths in response to policy of transmission source and with relatively small amount of transfer delay.

It is another object of the invention to provide a loose source routing method in which transmission source is capable of designating passing nodes sufficiently even if a number of the passing nodes is large.

A loose source routing method of this invention is provided to transfer an IP packet from a transmission source gateway to a transfer destination gateway by way of ATM nodes, which are freely designated.

At the transmission source gateway, the IP packet given from a user LAN is dissolved into ATM cells containing a BOM cell whose destination address designates the transfer destination gateway. In addition, at least one pseudo BOM cell whose destination address designates an ATM node in the ATM network is added and is located at a top place of a cell stream constructed by the dissolved ATM cells. Thus, the cell stream is transferred from the transmission source gateway to the designated ATM node in accordance with the destination address of the pseudo BOM cell. The designated ATM node discards the pseudo BOM cell so that the original BOM cell is now located at the top place of the cell stream. Then, the cell stream is transferred from the ATM node to the transfer destination gateway in accordance with the destination address of the BOM cell. The transfer destination gateway assembles the ATM cells into the IP packet, which is then sent to a user LAN.

In addition, the ATM node is designed to have a capability of newly adding a pseudo BOM cell whose destination address designates a next ATM node that the cell stream passes through next. In that case, at the ATM node, the pseudo BOM cell is discarded while the newly added BOM cell is located at the top place of the cell stream. Thus, the cell stream is transferred from the ATM node to the transfer destination gateway by way of the next ATM node designated by the newly added pseudo BOM cell.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

Figure 1:
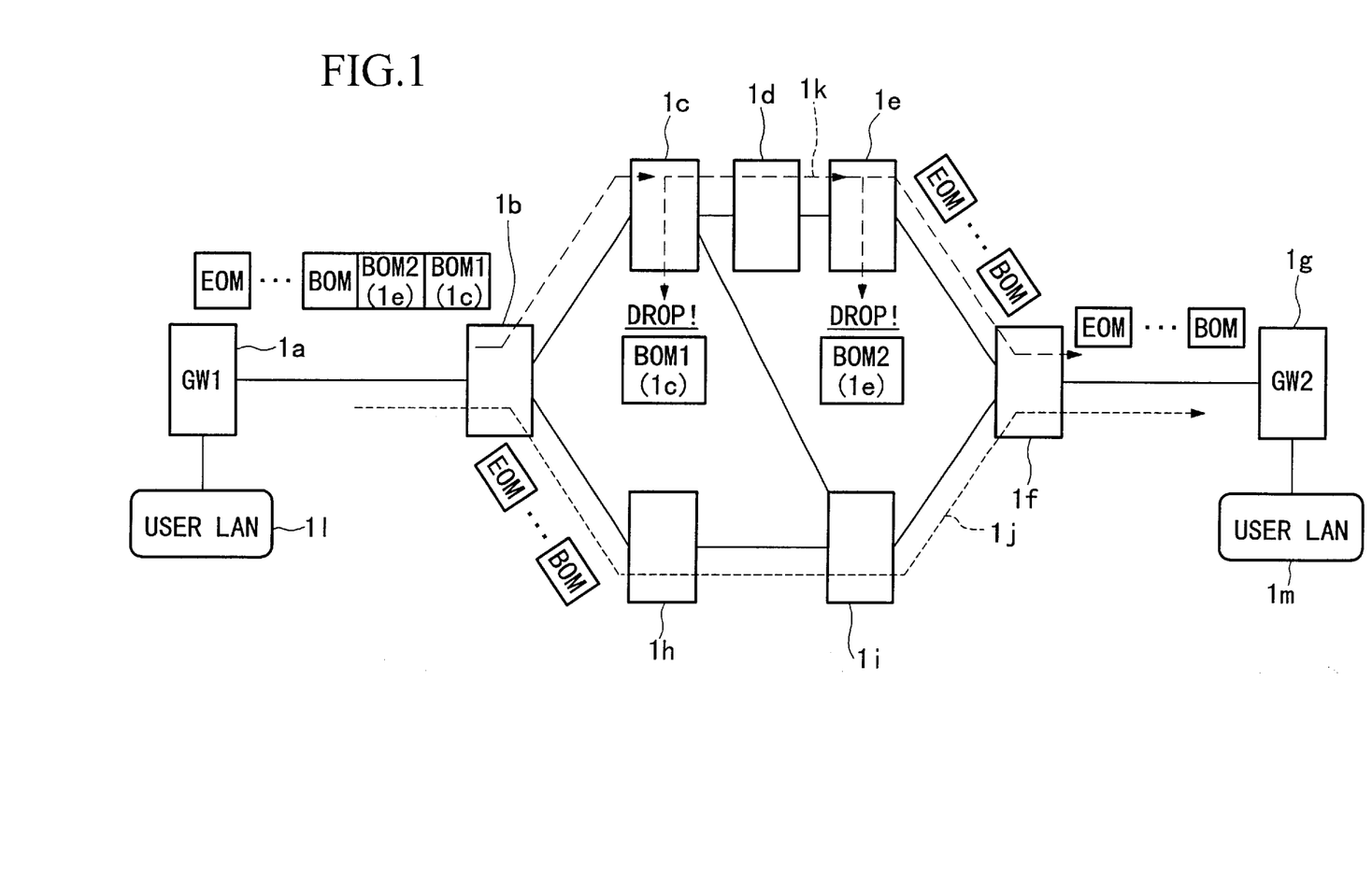
FIG. 1 is a conceptual diagram showing a system of a loose source routing method in accordance with a first embodiment of the invention.

FIG. 1 is a conceptual diagram showing a system of the loose source routing method in accordance with a first embodiment of the invention. Herein, a transmission source gateway 1$a$ holds a user LAN 1$l$. So, the transmission source gateway 1$a$ receives IP packets from the user LAN 1$l$, wherein the IP packets are dissolved into ATM cells (or ATM cell stream), which are then transmitted to an ATM network. A transfer destination gateway 1$g$ receives the ATM cell stream transmitted thereto over the ATM network, wherein the ATM cells are reassembled into the IP packets, which are then transferred to a user LAN 1$m$.

Reference symbols 1$b$, 1$c$, 1$d$, 1$e$, 1$f$, 1$h$ and 1$i$ designate ATM nodes which are arranged in the ATM network in a direction from the transmission source gateway 1$a$ to the transfer destination gateway 1$g$. Each of the ATM nodes detects a top cell (i.e., BOM cell) of the packet from the ATM cells transmitted thereto so as to perform routing of the ATM cells toward the next ATM node (or next gateway) in accordance with a destination address written on the BOM cell. Reference symbol 1$j$ (see a dotted line with an arrow) designates a transfer path for normal cells, which are transferred from the transmission source gateway 1$a$ to the transfer destination gateway 1$g$. In addition, reference symbol 1$k$ (see a dashed line with an arrow) designates a transfer path for normal cells, which are transferred from the ATM node 1$c$ to the ATM node 1$e$.

Figure 2:
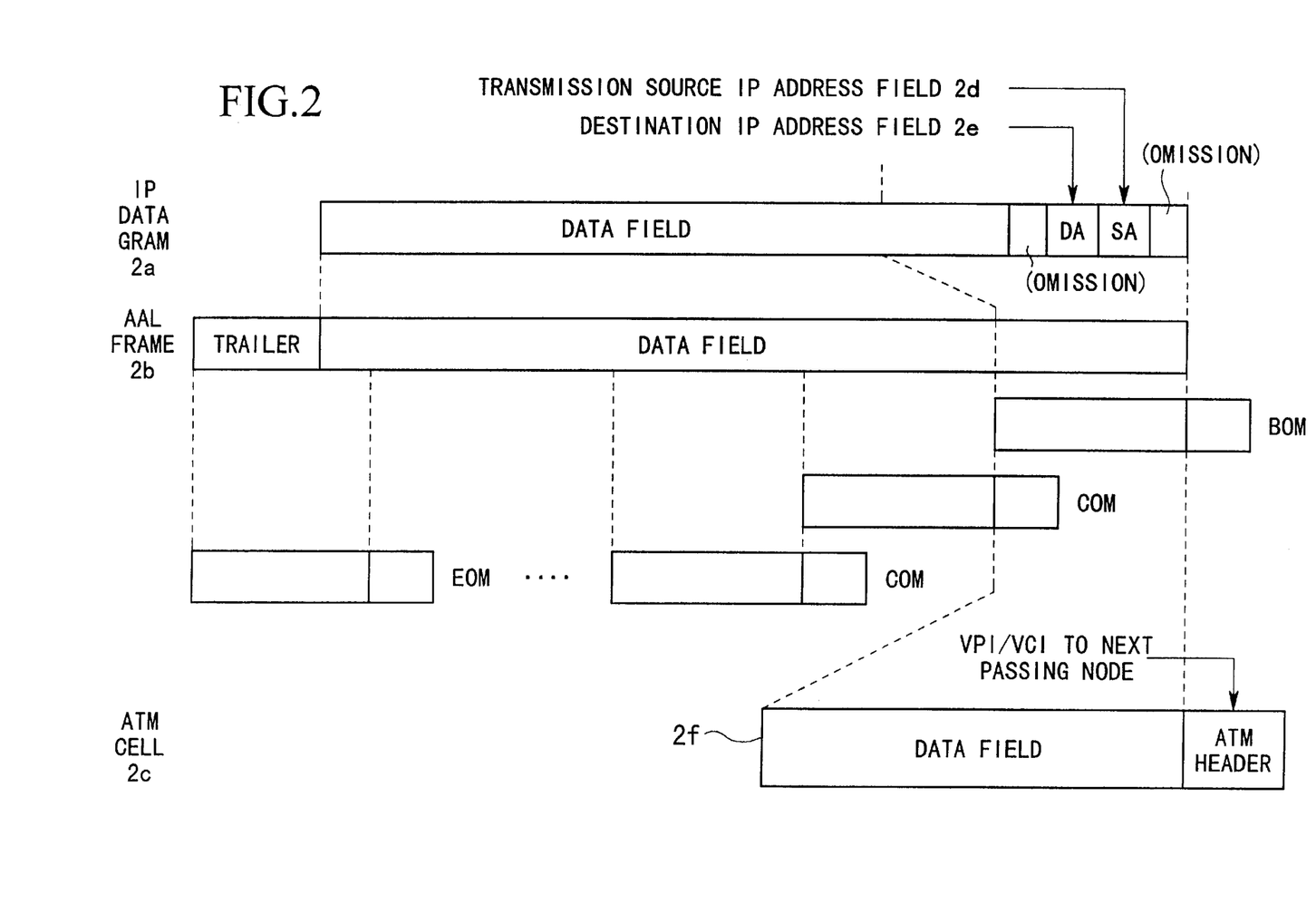
FIG. 2 shows an example of processing for cell formation of an IP packet, which is performed by a transmission source gateway shown in FIG. 1.

FIG. 2 shows an example of processing for formation of cells based on a packet, which is performed at the transmission source gateway. Particularly, FIG. 2 shows an example of processing for formation of cells based on an IP packet in accordance with AAL5 (i.e, AAL Type 5, where "AAL" is an abbreviation for "ATM Adaptation Layer"). Herein, reference symbol "2$a$" designates an IP packet (or IP datagram), while "2$b$" designates an AAL frame for performing processing for cell formation. In addition, reference symbol "2$c$" designates an ATM cell, which is produced by performing cell formation of the AAL frame 2$b$ and is transferred to an ATM network. Reference symbol "2$f$" designates a payload of a top cell (i.e., BOM cell) of the packet which is subjected to cell formation, wherein an IP header contains a transmission source IP address 2$d$ and a destination IP address 2$e$ of the IP datagram 2$a$. All pieces of information of the IP header are contained in the payload of the BOM cell. Incidentally, "VPI" is an abbreviation for "Virtual Path Identifier", while "VCI" is an abbreviation for "Virtual Channel Identifier".

Figure 3:
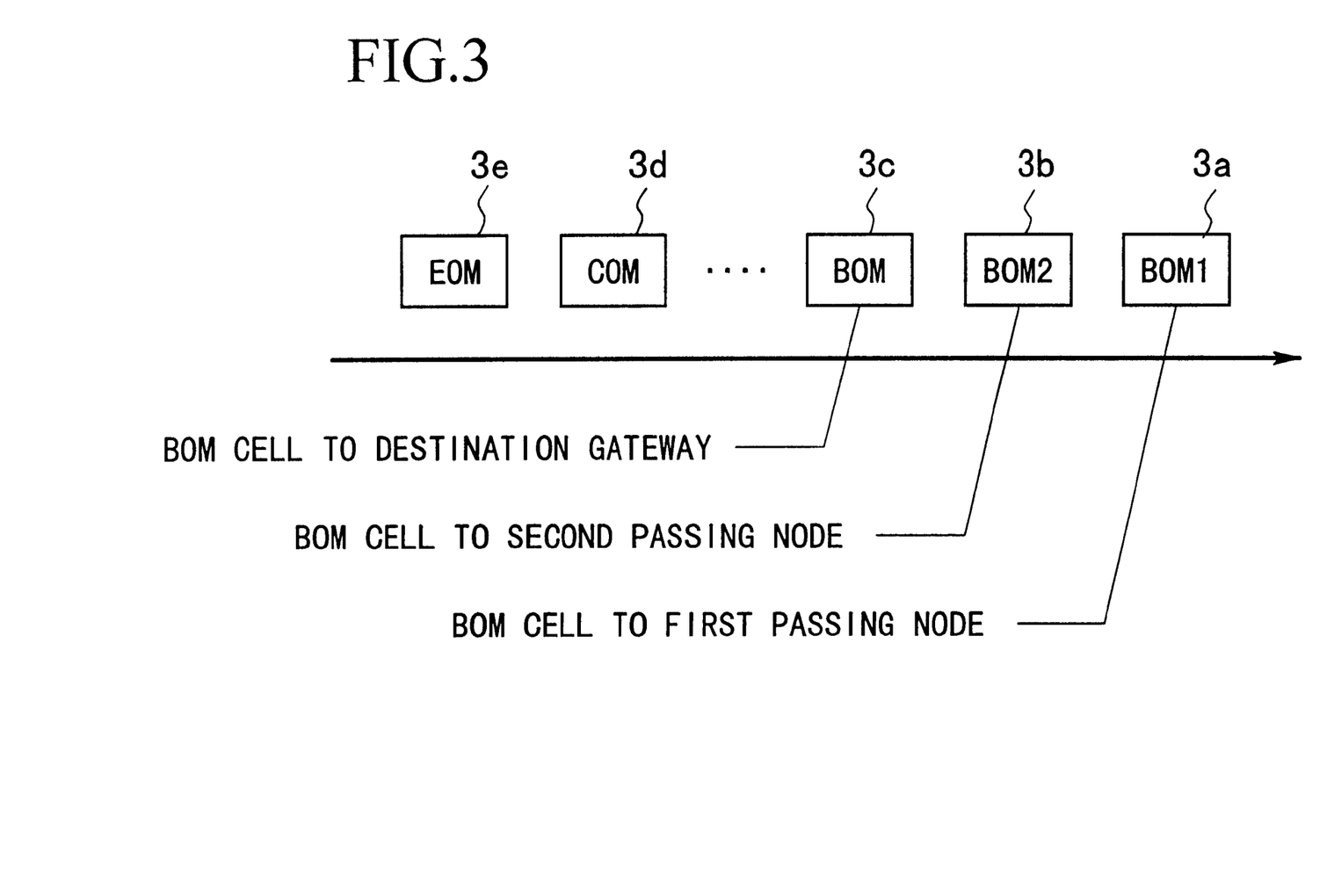
FIG. 3 shows an example of a configuration for cell stream, which is transmitted from the transmission source gateway.

FIG. 3 shows an example of a configuration of cell stream, which is transmitted by the transmission source gateway 1$a$.

The cell stream, which is subjected to loose source routing by the transmission source gateway 1a, is configured by a pseudo BOM cell 3a (BOM1), a pseudo BOM cell 3b (BOM2), a BOM cell 3c, a COM (Continuation of Message) cell 3d and an EOM (End of Message) cell 3e. Herein, each of the pseudo BOM cells 3a and 3b has a destination address corresponding to a passing node, which is designated. The BOM cell 3c corresponds to a top cell of the packet, which has an real destination address. The COM cell 3d is an intermediate cell of the packet. Further, the EOM cell 3e is a last cell of the packet.

A set of the BOM cell 3c, COM cell 3d and EOM cell 3e, which substantially correspond to the packet, are arranged to follow the pseudo BOM cells 3a and 3b. At a first place of the cell stream, the pseudo BOM cell 3a is placed to designate an address of an ATM node that the cell stream firstly passes through. At a second place of the cell stream, the pseudo BOM cell 3b is placed to designate an address of an ATM node that the cell stream secondly passes through. Such a pseudo BOM cell is placed at a top position of the packet until the packet reaches the ATM node designated by the destination address thereof. In that case, the pseudo BOM cell acts like the top cell of the packet instead of the real BOM cell 3c.

Figure 4:
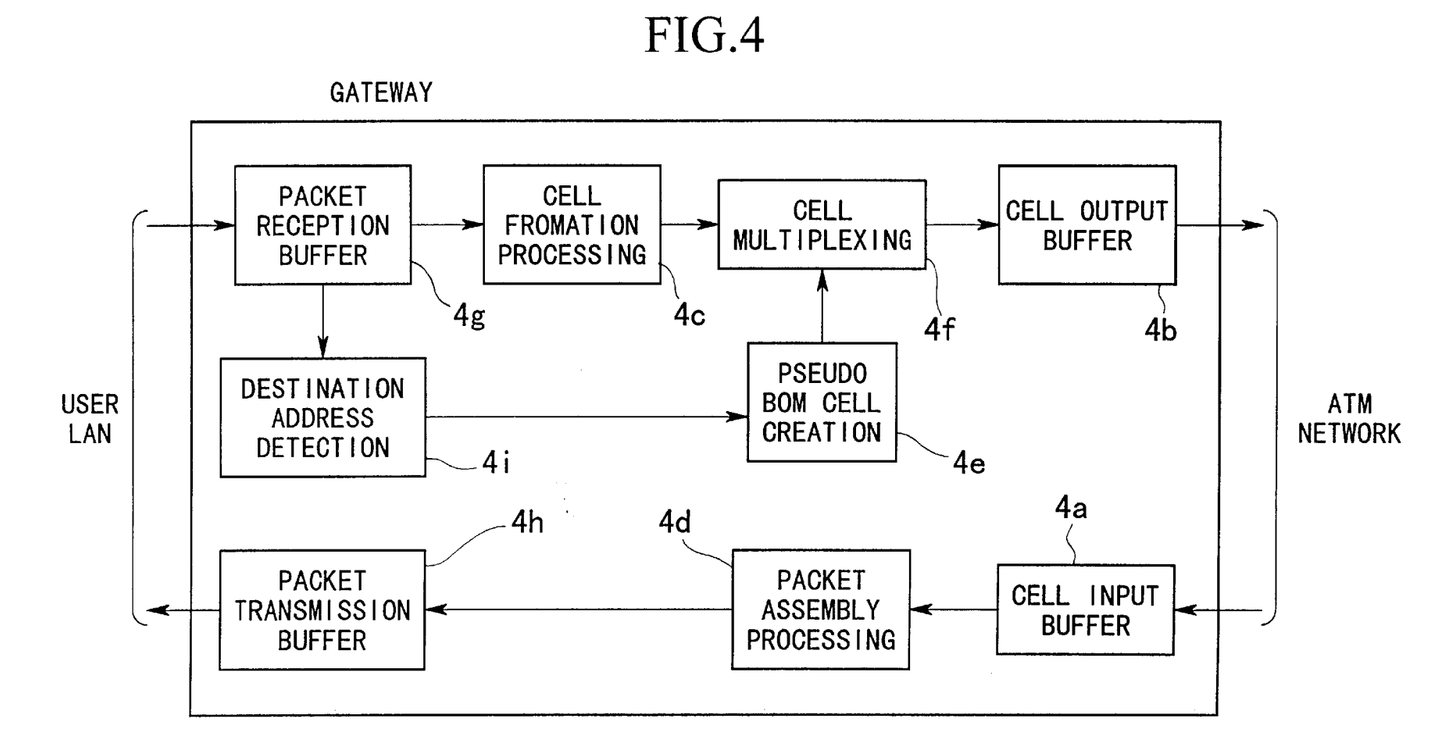
FIG. 4 is a block diagram showing an example of a configuration of the gateway.

FIG. 4 is a block diagram showing an example of a configuration for each of the gateways 1a and 1g shown in FIG. 1. The gateway has two inputs and two outputs, which correspond to a cell input buffer 4a, a cell output buffer 4b, a packet reception buffer 4g and a packet transmission buffer 4h respectively. Herein, the cell input buffer 4a receives cells from an ATM network. The cell output buffer 4b outputs the cells to the ATM network. The packet reception buffer 4g receives packets from an existing user LAN. The packet transmission buffer 4h temporarily retains IP packets to be sent to the user LAN. In addition, a cell formation processing block 4c performs ATM cell formation on the received packets, which are forwarded thereto from the packet reception buffer 4g. A packet assembly processing block 4d assembles ATM cells, output from the cell input buffer 4a, into prescribed IP packets.

A destination address detection block 4I detects a destination IP address from the received packet, which is received by the packet reception buffer 4g. Based on the destination IP address which is communicated from the destination address detection block 4I, a pseudo BOM cell creation block 4e creates a pseudo BOM cell containing an IP header whose destination address corresponds to an address of the "passing" ATM node. A cell multiplexing block 4f multiplexes the pseudo BOM cell, created by the pseudo BOM cell creation block 4e, with cells of the IP packet which are produced by the cell formation processing block 4c. Herein, the multiplexing of multiple pseudo BOM cells is performed in such a way that they are sequentially located at places, corresponding to an order of their "passing" nodes, prior to the cells of the IP packet.

Figure 5:
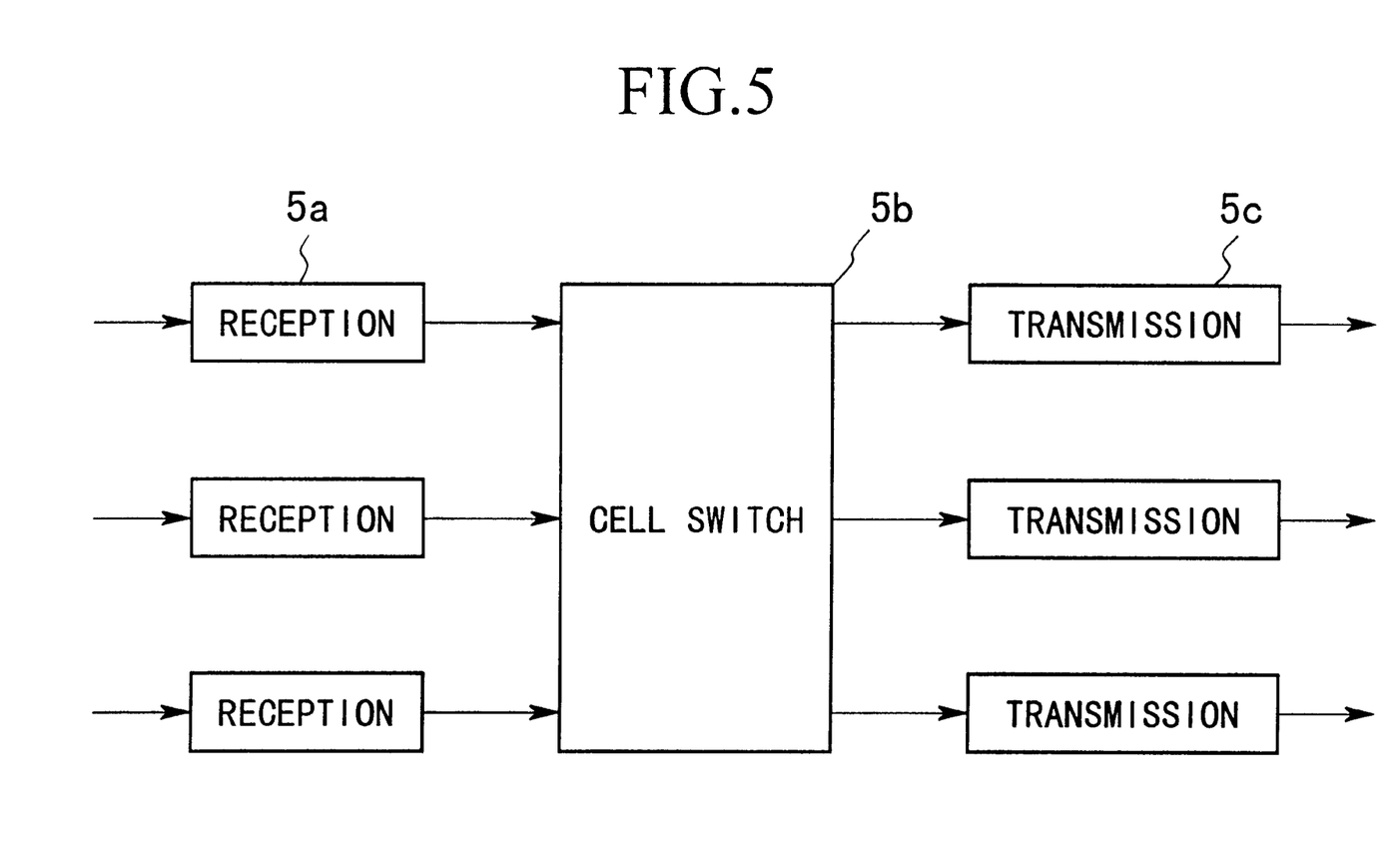
FIG. 5 is a block diagram showing an example of a configuration of an ATM node.

FIG. 5 is a block diagram showing an example of a configuration of a passing ATM node which is designated. Herein, reception blocks 5a work as an input interface unit. A cell switch block 5b performs switching of cells, input from the input interface unit 5a, in accordance with VPI/VCI. Further, transmission blocks 5c work as an output interface unit.

Figure 6:
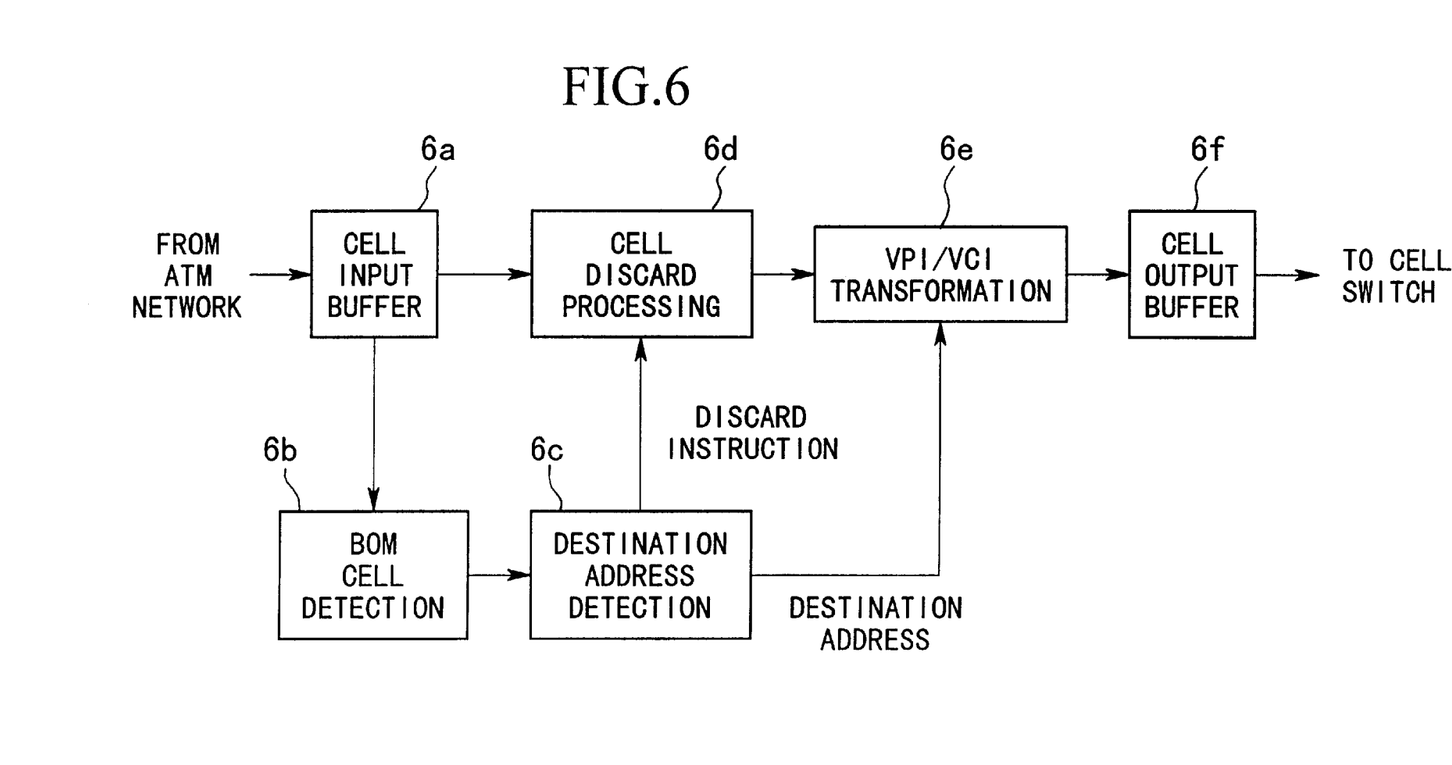
FIG. 6 is a block diagram showing a first example of an input interface unit of the ATM node shown in FIG. 5.

FIG. 6 is a block diagram showing a first example of a configuration of the input interface unit 5a of the ATM node. Herein, a cell input buffer 6a receives ATM cells transmitted thereto from the ATM network, while a cell output buffer 6f transmits the ATM cells to the cell switch block 5b. A BOM cell detection block 6b detects a BOM cell from the ATM cells received by the cell input block 6a. A destination address detection block 6c detects a destination IP address from the BOM cell detected by the BOM cell detection block 6b.

A cell discard processing block 6d operates when the detected BOM cell coincides with a pseudo BOM cell. That is, if the destination IP address of the detected BOM cell, which is detected by the destination address detection block 6c, coincides with an address of the ATM node in which the input interface unit 5a of FIG. 5 is contained, the detected BOM cell coincides with the pseudo BOM cell. So, the cell discard processing block 6d discards such a pseudo BOM cell in accordance with a discard instruction given from the destination address detection block 6c. A VPI/VCI transformation block 6e transforms (or rewrite) the VPI/VCI in order that the cells belonging to the same packet can be transferred in a prescribed course.

Next, operation of the first embodiment of the invention will be described with reference to FIG. 1 to FIG. 6, wherein the transmission source gateway 1a receives an IP packet from the user LAN 1l so as to transfer it to the transfer destination gateway 1g by way of the ATM nodes 1c and 1e. In the transmission source gateway 1a (see FIG. 4), the cell formation processing block 4c dissolves the "transmitting" IP packet into ATM cells. Based on an address of the transfer destination gateway 1g which is detected by the destination address detection block 4i, the pseudo BOM cell creation block 4e creates pseudo BOM cells 3a and 3b (see BOM1, BOM2 shown in FIG. 3). Herein, the pseudo BOM cell 3a contains a destination address field (see "2e" shown in FIG. 2) which corresponds to an address of the "firstly passing" ATM node 1c, while the pseudo BOM cell 3b contains a destination address field which corresponds to an address of the "secondly passing" ATM node 1e. In the cell multiplexing block 4f, the pseudo BOM cells 3a and 3b are located prior to a BOM cell 3c which contains a real destination address (i.e., the transfer destination gateway 1g). Then, such a cell stream (see FIG. 3) is transmitted to the ATM network.

In the ATM node 1b (see FIG. 6), the BOM cell detection block 6b detects a top cell of the cell stream of the received IP packet, i.e., the pseudo BOM cell 3a. The destination address detection block 6c detects the address of the "passing" ATM node 1c. In accordance with the destination address read from the pseudo BOM cell 3a, all of the cells belonging to the same IP packet, which ends at the EOM cell 3e, are subjected to VPI/VCI transformation. Then, those cells are transferred to the ATM node 1c.

In the ATM node 1c, the BOM cell detection block 6b detects the pseudo BOM cell 3a which is located at the top place of the cell stream, so the detected pseudo BOM cell 3a is forwarded to the destination address detection block 6c. In that case, the destination address detection block 6c of the ATM node 1c makes a decision that a value of the destination IP address field 2e of the detected pseudo BOM cell 3a coincides with an address value of the ATM node 1c. So, the destination address detection block 6c gives a discard instruction to the cell discard processing block 6d. In accordance with the discard instruction, the cell discard processing block 6d discards the pseudo BOM cell 3a.

Thus, the pseudo BOM cell 3b is now located at the top place of the cell stream instead of the "discarded" pseudo BOM cell 3a. So, the destination address detection block 6c detects the destination address of the pseudo BOM cell 3b.

In accordance with the destination address read from the pseudo BOM cell 3b, the cell stream is subjected to VPI/VCI transformation. Thus, all of the cells belonging to the same IP packet, which ends at the EOM cell 3e, are transferred to the ATM node 1e.

As similar to the aforementioned ATM node 1c, the ATM node 1e discards the pseudo BOM cell 3b, so that the BOM cell 3c is now located at the top place of the cell stream of the IP packet. In accordance with the destination address of the BOM cell 3c, the cell stream which ranges from the BOM cell 3c to the EOM cell 3e, are transferred to the transfer destination gateway 1g.

As a result, the "original" cell stream of the IP packet reaches the transfer destination gateway 1g which is designated by the BOM cell 3c. In the transfer destination gateway 1g (see FIG. 4), the packet assembly processing block 4d assembles the cells into an IP packet, which is then transmitted to the user LAN 1m.

In the present embodiment described above, the transmission source gateway creates the pseudo BOM cell having the address of the "passing" ATM node in the ATM network, thus the ATM node is capable of performing routing of the cells of the packet in accordance with the destination address of the pseudo BOM cell. Thus, the transmission source gateway is capable of freely changing the transfer path along which the cells of the packet are transferred.

Incidentally, if the transmission source gateway 1a does not add the pseudo BOM cell, the cell stream of the packet which ranges from the BOM cell to the EOM cell is transferred by way of a normal transfer route 1j, which is set between the gateways 1a and 1g.

Figure 7:
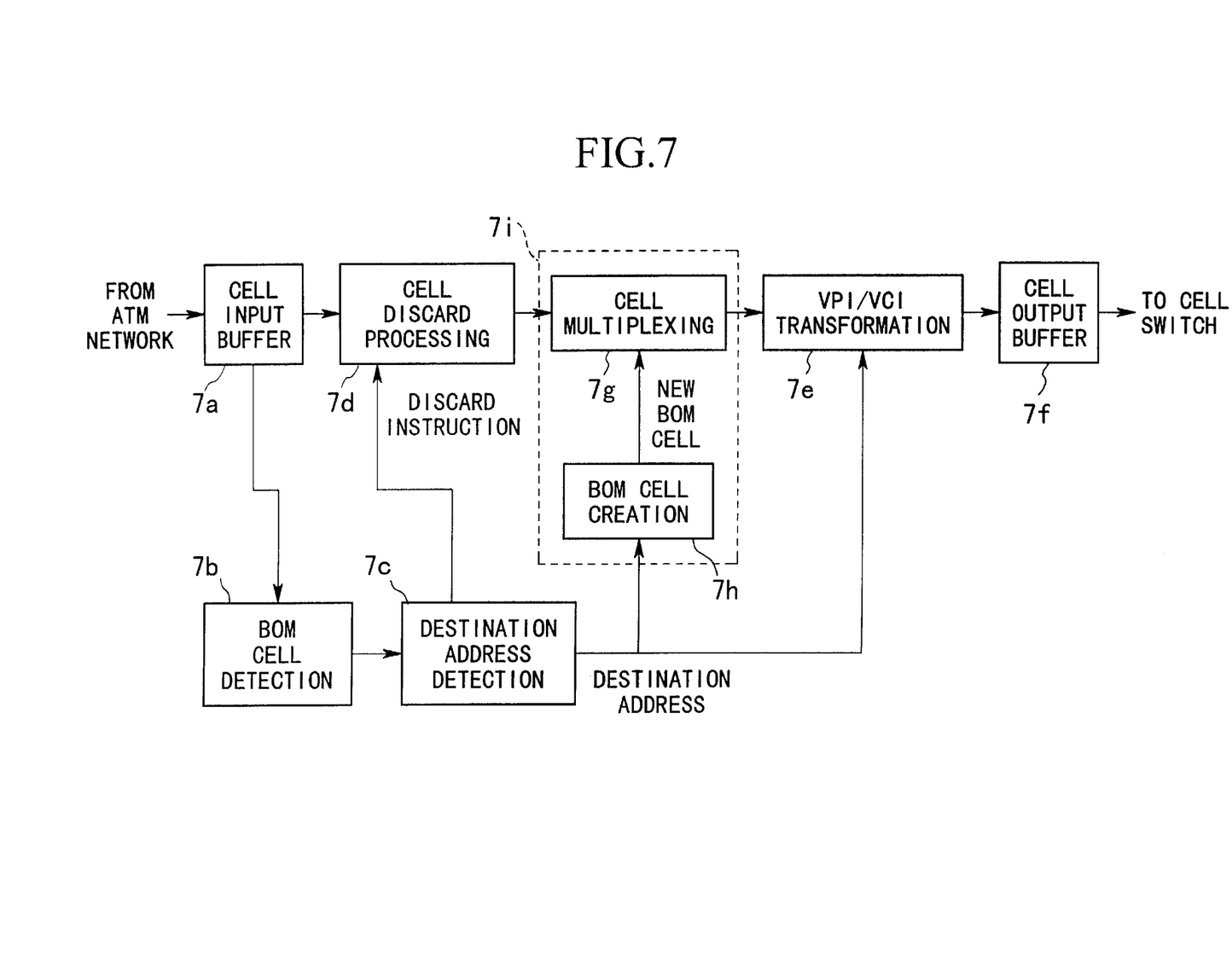
FIG. 7 is a block diagram showing a second example of the input interface unit of the ATM node.

FIG. 7 is a block diagram showing a second example of a configuration of the input interface unit 5a of the ATM node. Like the aforementioned configuration of FIG. 6, the input interface unit of FIG. 7 contains a cell input buffer 7a, a BOM cell detection block 7b, a destination address detection block 7c, a cell discard processing block 7d, a VPI/VCI transformation block 7e and a cell output buffer 7f. In addition to those elements 7a to 7f, the input interface unit of FIG. 7 further provides a BOM addition block 7i between the cell discard processing block 7d and the VPI/VCI transformation block 7e. The BOM addition block 7i is configured by a BOM cell creation block 7h and a cell multiplexing block 7g. Provision of the BOM addition block 7i enables source routing that uses the ATM node as a transmission source.

According to the first example of the input interface unit of FIG. 6, the "passing" ATM node, which is designated, merely provides a function that the cell discard processing block 6d discards the BOM cell. For this reason, if fault occurs on another "passing" ATM node following the above ATM node, it is impossible to make a detour to avoid such a fault ATM node. In the second example of FIG. 7, however, after discard of the pseudo BOM cell whose destination address designates the present ATM node itself, the BOM addition block 7i is capable of adding a pseudo BOM cell whose destination address corresponds to an address of a "newly passing" ATM node. Thus, at the present ATM node, it is possible to set a detour route appropriately. Because the ATM node, which is located in the middle of the transfer path between the gateways, is capable of adding the pseudo BOM cell, it is possible to reduce a number of the pseudo BOM cells that are added to the cell stream of the packet at the transmission source gateway.

Figure 8:
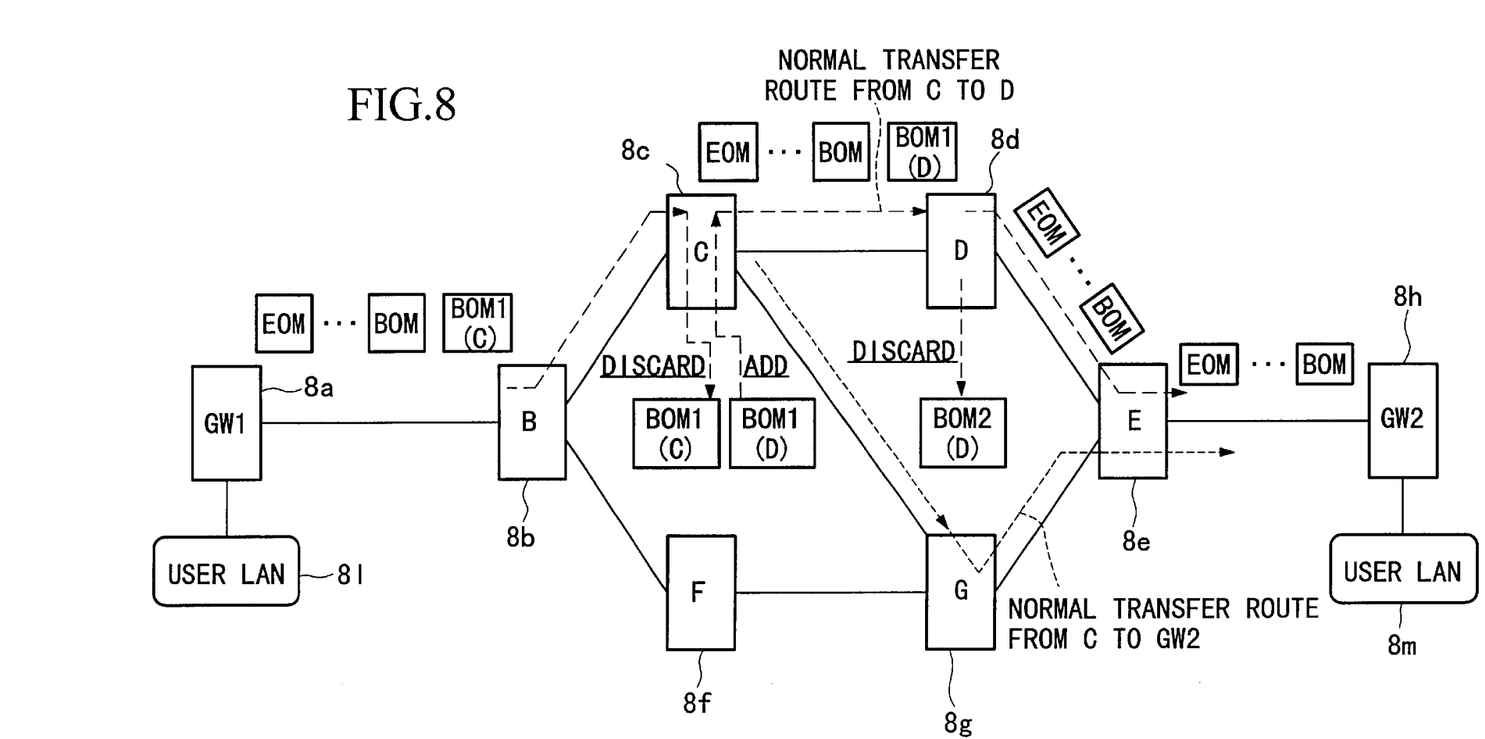
FIG. 8 is a conceptual diagram showing a system of the loose source routing method in accordance with a second embodiment of the invention.

FIG. 8 is a conceptual diagram showing a system of the loose source routing method in accordance with a second embodiment of the invention, wherein the aforementioned second example of FIG. 7 is used for the input interface unit of the ATM node.

Next, a description will be given with respect to the second embodiment of the invention with reference to FIG. 7 and FIG. 8, wherein a transmission source gateway 8a receives an IP packet from a user LAN 8l so as to transfer it to a transfer destination gateway 8h by way of an ATM node 8c. Like the aforementioned first embodiment shown in FIG. 1, the transmission source gateway 8a creates a pseudo BOM cell denoted by reference symbol "BOM1(C)", which is located prior to a real BOM cell containing a real destination address in a cell stream. Thus, the cell stream is transmitted to the ATM network.

At an ATM node 8b, the BOM cell detection block 7b (see FIG. 7) detects a top cell of the cell stream of the received IP packet, i.e., the pseudo BOM cell "BOM1(C)". So, the destination address detection block 7c detects an address of the "passing" ATM node 8c from BOM1(C). In accordance with the destination address read from BOM1(C), all of the cells of the same IP packet, which ends at the EOM cell 3e, are subjected to VPI/VCI transformation. Then, the cell stream is transferred to the ATM node 8c.

At the ATM node 8c, the BOM cell detection block 7b detects the top cell "BOM1(C)" of the cell stream, which is then forwarded to the destination address detection block 7c. Herein, the destination address detection block 7c makes a decision that a value of a destination IP address field (2e) of the detected cell "BOM1(C)" coincides with an address value of the "present" ATM node 8c. So, the destination address detection block 7c gives a discard instruction to the cell discard processing block 7d. In accordance with the discard instruction, the cell discard processing block 7d discards the cell "BOM1(C)", so that the real BOM cell "BOM" is now located at the top place of the cell stream. Thus, the destination address detection block 7c detects a real destination address of the real BOM cell. In accordance with the real destination address read from the real BOM cell, the cell stream is subjected to VPI/VCI transformation. Thus, the cell stream of the packet is transferred from the ATM node 8c to the transfer destination gateway 8h by way of a normal transfer route, which passes through nodes 8g and 8e sequentially.

If fault exists in the above normal transfer route, the destination address detection block 7c of the ATM node 8c instructs the BOM cell creation block 7h to create a pseudo BOM cell for a detour route. Thus, the BOM cell creation block 7h creates a new pseudo BOM cell denoted by "BOM1(D)", which is then forwarded to the cell multiplexing block 7g. The cell multiplexing block 7g locates the new pseudo BOM cell "BOM1(D)" prior to the real BOM cell which is located at the top place of the cell stream of the packet. Then, the cell stream containing BOM1(D) is forwarded to the VPI/VCI transformation block 7e. In accordance with the destination address read from the new pseudo BOM cell "BOM1(D)", the VPI/VCI transformation block 7e performs VPI/VCI transformation. Then, the cell stream is transferred to an ATM node 8d.

At the ATM node 8d, the cell discard processing block discards the pseudo BOM cell "BOM1(D)", so that the real BOM cell is now located at the top place of the cell stream of the packet again. In accordance with the real destination address of the real BOM cell, the cell stream, which ranges from the BOM cell to the EOM cell, is transferred to the transfer destination gateway 8h by way of an ATM node 8e.

Lastly, effects of the invention can be summarized as follows:

Because the present invention transfers the cell stream belonging to the same packet, which ends at the EOM cell, in accordance with the destination address read from the BOM cell while at each of the passing nodes, the next passing node is designated by only the pseudo BOM cell of the cell stream, it is unnecessary to conduct assembly of the packet with respect to the transferred cell stream, so it is possible to reduce transfer delay of the cell stream. In addition, the transmission source gateway is capable of conducting designation of the passing node by merely adding the pseudo BOM cell whose destination address corresponds to the address of the passing node. Further, a number of the added BOM cells is irrelevant to a maximum length of the packet, so there is no limit in the number of the passing nodes which are designated. Thus, the present invention is capable of designating the transfer path in a detailed way.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A loose source routing system comprising:
   a transmission source gateway for dissolving an IP packet, sent thereto from a first user LAN, into a plurality of ATM cells, which are transmitted to an ATM network;
   at least one ATM node, provided in the ATM network, for detecting a destination address of the IP packet from the ATM cells and for rewriting VPI/VCI of the ATM cells of the IP packet in accordance with the detected destination address so as to transfer the ATM cells in a prescribed cource of the ATM network; and
   a transfer destination gateway for receiving the ATM cells, which are transferred thereto over the ATM network by way of the ATM node, and for assembling the ATM cells into an IP packet, which is then sent to a second user LAN,
   wherein the transmission source gateway is equipped with BOM cell addition means for adding at least one BOM cell at a top place of the ATM cells of the IP packet, so that the BOM cell designates an address of the ATM node through which the ATM cells of the IP packet pass.

2. A loose source routing system as defined in claim 1 wherein if a plurality of BOM cells are added to the ATM cells of the IP packet so that the ATM cells pass through a plurality of ATM nodes, a first one of the plurality of the ATM nodes transfers the ATM cells of the IP packet to a next one of the plurality of the ATM nodes in accordance with a destination address of a top one of the BOM cells.

3. A loose source routing system as defined in claim 1 wherein the transmission source gateway contains BOM cell creation means for creating a new BOM cell containing an IP header whose destination IP address corresponds to an address of the ATM node through which the ATM cells of the IP packet pass, so that the BOM cell addition means locates the new BOM cell at a top place of the ATM cells of the IP packet.

4. A loose source routing system as defined in claim 1 wherein the ATM node comprises BOM cell detection means for detecting the BOM cell contained in the IP packet transmitted thereto,
   destination address detection means for reading a destination address from the detected BOM cell,
   cell discard processing means for discarding the BOM cell if the read destination address coincides with an address of the present ATM node so that a next BOM cell following the discarded BOM cell is now located at a top place of the ATM cells of the IP packet, and
   cell routing means for performing VPI/VCI transformation on the ATM cells of the IP packet, which ends at an EOM cell, in accordance with a next destination address read from the next BOM cell so that the ATM cells of the IP packet can be transferred in a prescribed course on the ATM network.

5. A loose source routing system as defined in claim 1 wherein the ATM node comprises BOM cell creation means for newly creating at least one BOM cell having an address of another ATM node through which the ATM cells of the IP packet pass, and
   BOM cell addition means for adding the newly created BOM cell, which is located prior to an original BOM cell contained in the IP packet,
   whereby the ATM node is capable of designating another ATM node by using the newly created BOM cell.

6. A loose source routing method of an IP packet on an ATM network containing at least one ATM node, comprising the steps of:
   dissolving the IP packet, which is transferred from a first gateway to a second gateway through the ATM network, into a plurality of ATM cells containing a BOM cell whose destination address designates the second gateway, which construct a cell stream to be transferred;
   adding at least one pseudo BOM cell whose destination address designates an ATM node through which the cell stream pass, wherein the pseudo BOM cell is located at a top place of the cell stream;
   transferring the cell stream from the first gateway to the designated ATM node in accordance with the destination address of the pseudo BOM cell;
   discarding the pseudo BOM cell at the designated ATM node, so that the BOM cell is now placed at a top place of the cell stream;
   transferring the cell stream from the designated ATM node to the second gateway in accordance with the destination address of the BOM cell of the cell stream; and
   assembling the ATM cells of the cell stream into the IP packet at the second gateway.

7. A loose source routing method as defined in claim 6 further comprising the step of:
   creating a new pseudo BOM cell whose destination address newly designates a next ATM node in the ATM network so that at the ATM node, the pseudo BOM cell is discarded while the new pseudo BOM cell is added to the cell stream,
   whereby the cell stream is transferred to the second gateway by way of the next ATM node designated by the new pseudo BOM cell.

* * * * *